(12) United States Patent
Umeno

(10) Patent No.: US 6,289,296 B1
(45) Date of Patent: *Sep. 11, 2001

(54) STATISTICAL SIMULATION METHOD AND CORRESPONDING SIMULATION SYSTEM RESPONSIVE TO A STORING MEDIUM IN WHICH STATISTICAL SIMULATION PROGRAM IS RECORDED

(75) Inventor: Ken Umeno, Tokyo (JP)

(73) Assignee: The Institute of Physical and Chemical Research (Riken), Wako (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 134 days.

(21) Appl. No.: 09/050,998

(22) Filed: Mar. 31, 1998

(30) Foreign Application Priority Data

Apr. 1, 1997 (JP) ................................................. 9-082723

(51) Int. Cl.[7] .................................................. G06F 17/50
(52) U.S. Cl. .................................. 703/2; 708/250; 380/46
(58) Field of Search ........................ 395/500.23; 364/717; 708/250; 380/46; 331/78; 703/2

(56) References Cited

U.S. PATENT DOCUMENTS

| | | | |
|---|---|---|---|
| 4,545,024 | * 10/1985 | Maher et al. ...................... | 364/717 |
| 4,769,777 | * 9/1988 | Bittle et al. ...................... | 364/717 |
| 4,799,259 | * 1/1989 | Ogrodski ........................... | 380/46 |
| 4,833,633 | * 5/1989 | Morris ............................... | 364/717 |
| 5,007,087 | * 4/1991 | Bernstein et al. ................. | 380/46 |
| 5,625,579 | * 4/1997 | Hinsberg, III et al. ........... | 364/578 |
| 5,696,828 | * 12/1997 | Koopman, Jr. .................... | 380/46 |
| 5,745,385 | * 4/1998 | Hinsberg, III et al. ........... | 364/578 |
| 5,748,847 | * 5/1998 | Lo ..................................... | 395/23 |
| 5,875,196 | * 2/1999 | Chakradhar et al. ............. | 371/22.1 |

* cited by examiner

Primary Examiner—Kevin J. Teska
Assistant Examiner—Thai Phan
(74) Attorney, Agent, or Firm—Griffin & Szipl, P.C.

(57) ABSTRACT

A method for simulating a stochastic phenomenon, particularly one employing a Monte Carlo method, includes a step for generating random numbers having a nonuniform density function ρ(x) based on an ideal model of a chaotic dynamic system in the form $X_{n+1}=f(X_n)$. The ideal model of chaotic map F(x) is a class of an algebraic map derived from an addition theorem of an elliptic function. The nonuniform density function ρ(x) is expressed by an algebraic function of a dynamical variable x. Examples of the ideal model of the chaotic map F(x) include a generalized Ulam-von Neumann map and a generalized cubic map. The nonuniform density function ρ(x) of the chaotic maps has the form $X_{n+1}=F(X_n)$. The class of chaotic dynamical systems is ideal in the sense that the invariant measure ρ(x)dx satisfies the ergodic property required by the Monte Carlo method. Thus, a statistical simulation can be performed in the same manner as the conventional Monte Carlo method. Compared to the usual Monte Carlo method, the computing speed is increased while the computing error is decreased. Thus, a time for a convergence of a computation result can be reduced, whereby problems, which have not been heretofore able to be treated, can be solved.

2 Claims, 5 Drawing Sheets

GENERALIZED
ULAM-VON NEUMANN MAP (l,m)=(0,0),(0,-10),···,(0,-100).

FIG. 1A

GENERALIZED
ULAM-VON NEUMANN MAP (l,m)=(0.5,0),(0.5,0.1),···,(0.5,0.9).

FIG. 1B

GENERALIZED
CUBIC MAP (l,m)=(0,0),(0,−1),···,(0,−10).

FIG. 1C

GENERALIZED
CUBIC MAP (l,m)=(0.98,0),(0.98,−10),···,(0.98,−100).

STATISTICAL SIMULATION METHOD AND CORRESPONDING SIMULATION SYSTEM RESPONSIVE TO A STORING MEDIUM IN WHICH STATISTICAL SIMULATION PROGRAM IS RECORDED

BACKGROUND OF THE INVENTION

1. Field of the Invention

The present invention relates to a statistical simulation method and corresponding simulation system for statistically computing an expected value of a physical quantity or the like, and a storing medium in which a statistical program is recorded. The present application claims priority under 35 U.S.C. §119 of Japanese Patent Application No. 9-082723, filed Apr. 1, 1997, the entire disclosure of which is incorporated herein by reference.

2. Description of the Related Art

The Monte Carlo method is well known as a statistical simulation method for statistically computing an expected value of a physical quantity or the like. This Monte Carlo method has been heretofore widely used in, for example, the device modeling field. TED ("Gunn Effect Device"), MOSFET, MESFET, bipolar transistors, hetero-structure devices, Schottky diodes, photo-detectors and the like are known as devices developed by the use of this method. It will be appreciated that the Monte Carlo method can also be used for simulation of PN junction devices, heterojunction devices, or the like. It will also be noted that the Monte Carlo method has applications to other many-body problems having numerous collected uncertainties, e.g., operations research and research in the sociology field.

It will be appreciated that the above-described Monte Carlo method is a method for computing or simulating a stochastic phenomenon by generating random numbers and constructing the stochastic phenomenon. As disclosed in U.S. Pat. No. 5,301,118, which reference is incorporated herein by reference, Monte Carlo analysis is a predictive technique, which can be used, for example, to determine variation of assemblies based on probabilistic modeling. Monte Carlo analysis is performed by establishing a range for each individual component tolerance, for example a range of USL-LSL expressed in terms of a probability density function. A random sampling fitting a mathematically defined distribution is taken from within this range, and the response of the circuit or system is evaluated. The output values can then be further analyzed using traditional statistical methods.

Monte Carlo analysis, i.e., analysis performed according to the Monte Carlo method, uses a random number generator to perform the distribution sampling. Therefore, it will be appreciated that Monte Carlo simulation can be employed to simulate large sample sizes on digital computers. In particular, Monte Carlo analysis is especially useful where complex assemblies can not be readily or realistically analyzed by traditional linear methods, such as root- sum- of -squares analysis or worst case analysis. It will also be appreciated that Monte Carlo analysis can be useful where the completed assemblies needing analysis are costly or time consuming to manufacture.

Assuming that this Monte Carlo method is applied to a many-particle simulation, this method is based on the assumption that a motion of a certain particle (an electron or a molecule) can be tracked over a sufficiently long time whereby information on the behavior of the whole electronic system or the entire gas system can be obtained. For example, in a free traveling process of a certain particle (carrier), an inherent stochastic distribution function can be used to establish conditions for determining the mean free path, whereby the random numbers are continuously generated. An elapse of time of the carrier is measured, whereby the motion of the particle is simulated.

The Monte Carlo method is based on the ergodic hypothesis that "a physical average is equal to a longtime average". That is, this method succeeds in using ergodicity of a deterministic equation (1) for generating the random numbers.

Formula (1)

$$X_{n+1} = F(X_n) \tag{1}$$

A possession of the ergodicity by the equation (1) herein means that an invariant measure (dx) is present corresponding to a physical quantity $X_n$, where $X_n \in M$, and where the equation (1) is defined in terms of a physical space M. The dynamical system of equation (1) has ergodicity if the relationship defined in formula (2) holds. It will be appreciated that the formula (2) means that an integral of a function $Q(x)$ with respect to the invariant measure $\mu(dx)$ on a phase space M is equal to a time integral of $Q(X_i)$ (wherein $Q(X_i)$ is a Lebesgue integrable function of $X_i$). The formula (2) represents the above-mentioned assumption by an expression. According to the formula (2), in the Monte Carlo method, a space integral on the phase space M on the right side of the formula (2) is easily computed because the invariant measure $\mu(dx)$ represents the underlying stochastic phenomenon.

Formula (2)

$$\lim_{N \to \infty} \frac{1}{N} \sum_{i=1}^{N} Q(x_i) = \int_M Q(x)\mu(dx)$$

Stated another way, the term $\mu(dx)$ is the invariant measures on M and $Q(x)$ is a regular function, which makes the right hand side of formula (2) finite. $Q(x)$ is a Lebesgue integrable function of x. Thus, Monte Carlo simulations can be thought of as evaluating the right hand side of formula (2) by approximately calculating the left hand side of formula (2) under the assumption of ergodicity.

As described above, the Monte Carlo method is a method for statistically simulating the expected value of a physical quantity, or the like, on a computer. This method has been widely used. However, an environment, in which a large-sized computer can be employed, is generally required for application of the Monte Carlo method, although this method can sometimes be successfully performed on more readily available, i.e., less powerful, computers when the simulated system is relatively simplistic. It will be appreciated that the conventional Monte Carlo method must generate the random numbers having a uniform invariant measure $\mu(dx)$ for each step in the simulation process. Moreover, since the generated uniform random numbers are "pseudo-random numbers having a finite period", it will be noted that the computing speed cannot be advantageously improved to any great extent nor can the computing error be reduced by any appreciable extent. Thus, the time required for the simulation process to produce convergence of the computation result cannot be reduced. In many cases, even if a large-sized computer can be dedicated to the simulating system, the Monte Carlo method cannot be advantageously employed.

SUMMARY OF THE INVENTION

The present invention was motivated by a desire to solve the above-identified problems. Thus, one object of the present invention is to provide a statistical simulation method capable of performing a statistic simulation in the same manner as the Monte Carlo method.

Another object of the present invention is to provide a statistical simulation method capable of performing a statistical simulation while greatly improving the computing speed of the simulation with respect to the speed achieved by the Monte Carlo method.

Still another object of the present invention to is provide a statistical simulation method capable of performing a statistical simulation while reducing computing error to a level below that associated with the Monte Carlo method.

Yet another object of the present invention is to provide a statistical simulation method capable of performing a statistical simulation while reducing the time to convergence of a computation result with respect to the convergence time associated with the Monte Carlo method.

Another object of the present invention is to provide a statistical simulation method capable of performing a statistical simulation which heretofore has not been possible using the conventional Monte Carlo method.

Although the objects of the present invention are discussed above with respect to a statistical simulation method, it will be appreciated that the present invention is not so limited. Thus, computer systems programmed with instructions embodying the statistical simulation method and storage or storing media which store computer readable instructions for converting a general purpose computer into a system simulator are also considered to be within the scope of the present invention.

According to the present invention, there is provided a statistical simulation method for statistically performing a computation by generating random numbers and constructing a stochastic phenomenon for the computation of an expected value of a physical quantity and a many-body problem, wherein the random numbers having a nonuniform density function $\rho(x)$ are generated by a chaotic dynamical system $Xn+1=F(Xn)$.

According to a preferred embodiment of the present invention, the nonuniform density function $\rho(x)$ is infinite when x=0 and 1, and the non-uniform density function $\rho(x)$ is a convex continuous curved line within a range of 0<x<1.

Furthermore, an ideal model of the chaotic map (F(x)) is expressed by a an algebraic function derived from an addition theorem of an elliptic represented by a generalized Ulam-von Neumann map or a generalized cubic map, and the nonuniform density function $\rho(x)$ is expressed by a formula (3) in case of the generalized Ulam-von Neumann map and the generalized cubic map. Herein, the elliptic function means all rational functions of Jacobi elliptic function cn(x), sn(x) and dn(x), including sin(x), cos(x) and tan(x).

Furthermore, a random number sequence having the nonuniform density function generated by the ideal model of chaos F(x) advantageously can be converted into a uniform random number sequence having a long period, whereby a typical Monte Carlo computation can also be performed.

Formula (3)

$$\mu(dx) = \rho(x)dx$$

$$\rho(x) = \frac{1}{2K(l,m)\sqrt{x(1-x)(1-lx)(1-mx)}}$$

According to the method of the present invention, random numbers having the density function $\rho(x)$ can be successively generated employing a chaos map F(x). More specifically, given an orbit of a point x, which is assumed from characteristics of chaos, it will be appreciated that the orbit is made at random. Thus, since the chaos map F(x) is available for use in determining random values, computing speed of a computer operating in accordance with this principle is itself faster than the speed which can be achieved using the conventional Monte Carlo method, which, it will be noted, must generate the random numbers for each single step in the simulation method.

Stated another way, in the method according to the present invention, the use of the ideal method of a chaos map F(x) results in a nonuniformity of the density function $\rho(x)$. Arithmetic random numbers satisfying the uniform density function are thus generated. Compared to the conventional Monte Carlo method for simulating the stochastic phenomenon, experimental results on concrete applications demonstrate both that the computing error is reduced and that the convergence is more rapidly achieved. Specific examples are described in greater detail below. Since other approaches advantageously can be performed in the same manner as the conventional Monte Carlo method, the statistical simulation can be performed in the same manner as the conventional Monte Carlo method.

Furthermore, the nonuniform random number sequence generated by the ideal model of a chaotic map F(x) can be readily converted into the uniform random number sequence. Thus, the method according of the present invention can be applied in the very same manner as the conventional Monte Carlo method is employed.

Moreover, the time for the convergence of the computation result can be reduced, whereby the problems, which have not heretofore been able to be treated, can be addressed.

Furthermore, according to the present invention, there is provided a storing medium in which a statistical simulation program is stored in machine-readable format. The program instructs a general purpose computer to statistically perform the computation needed for statistical simulation, i.e., generating the random numbers having the nonuniform density function $\rho(x)$ according to the ideal model of chaotic mapping F(x) and constructing the stochastic phenomenon for the computation of the expected value of the physical quantity and the many-body problem. The storing medium is used, whereby the application of the present invention can be rapidly performed without error.

These and other objects, features and advantages of the present invention are provided in a statistical simulation method for statistically performing a computation by generating random numbers and constructing a stochastic phenomenon for one of the computation of an expected value of a physical quantity and a many-body problem. The improvement comprises the step of generating chaotic random numbers having a nonuniform density function $\rho(x)$ using a chaotic dynamical system of the form $Xn+1=F(Xn)$.

According to one aspect of the invention, the nonuniform density function $\rho(x)$ is infinite when x=0 and x=1, and the nonuniform density function ρ(x) is a convex continuous curved line within a range of 0<x<1.

According to another aspect of the present invention, F(Xn), which represents the chaotic dynamical system, is expressed by an algebraic function derived from an additive theorem of an elliptic function.

According to yet another aspect of the present invention, the improved method includes a step for converting the chaotic random numbers generated by the chaos model F(Xn) (wherein F(Xn) is an algebraic function of Xn) into a uniform random number sequence having a long period prior to performing the computation.

These and other objects, features and advantages of the present invention are provided by a storage medium which stores computer-readable instructions instructing a general purpose computer to execute a statistical simulation program, the program performing its computations by generating chaotic random numbers based on a nonuniform density function ρ(x) of a chaotic map F(x) and constructing a stochastic phenomenon for the computation of an expected value of the one of the physical quantity and the many-body problem.

These and other objects, features and advantages of the present invention are provided by a memory element which stores a uniform random number sequence having a long period, one of which uniform random numbers is output from the memory upon input of one of a sequence of chaotic random numbers having a nonuniform density function ρ(x) using a chaotic dynamical system of the form Xn+1=F(Xn).

These and other objects, features and advantages of the present invention are provided by a combination comprising:
- a first memory which stores a statistical simulation program including subroutines which generate chaotic random numbers based on a non-uniform density function ρ(x) of a chaotic map F(x) and constructs a stochastic phenomenon for the computation of an expected value of one of a physical quantity and a many-body problem;
- a processor which executes the statistical simulation program using the chaotic random numbers; and
- a second memory which stores interim and resultant information generated by the processor.

These and other objects, features and advantages of the present invention are provided by a combination comprising:
- a first memory which stores a statistical simulation program including subroutines which generate chaotic random numbers based on a non-uniform density function ρ(x) of a chaotic map F(x) and constructs a stochastic phenomenon for the computation of an expected value of one of a physical quantity and a many-body problem;
- a look-up table which stores a uniform random number sequence having a long period, one of which uniform random numbers is output from said look-up table upon input of one of the sequence of said chaotic random numbers;
- a processor which executes the statistical simulation program using members of the uniform random number sequence; and
- a second memory which stores interim and resultant information generated by the processor.

The other objects and advantageous features of the present invention will become apparent from the following description with reference to the accompanying drawings.

DETAILED DESCRIPTION OF THE PREFERRED EMBODIMENTS

The preferred embodiments of the present invention will be described below with reference to the accompanying drawings. Portions common to the drawings have the same reference numerals, whereby the repeated description is omitted.

In the first place, the present invention will be described in comparison with the Monte Carlo method employing uniform random numbers.

As discussed above, the Monte Carlo method is a method for simulating a stochastic phenomenon on a computer. From one point of view, the method according to the present invention also belongs to the generic category of simulation methods, of which the Monte Carlo method is one member. However, in all applications of the conventional Monte Carlo methods, arithmetic random numbers having a uniform density function must first be generated before the stochastic phenomenon is simulated. On the other hand, the method according to the present invention permits random numbers having a nonuniform density function ρ(x) to be generated first in accordance with an ideal model of chaos map, which chaos map is universally exhibited in nature. This is one of the fundamental differences between the method according to the present invention and the conventional Monte Carlo method.

An example of the ideal model of chaos map F(x) advantageously can be expressed by a formula (4), although other expressions can be employed. For example, formula (4) represents two different cases, as discussed in greater detail immediately. In either case, the nonuniform density function ρ(x) preferably is expressed by formula (5).

Figure 1A:
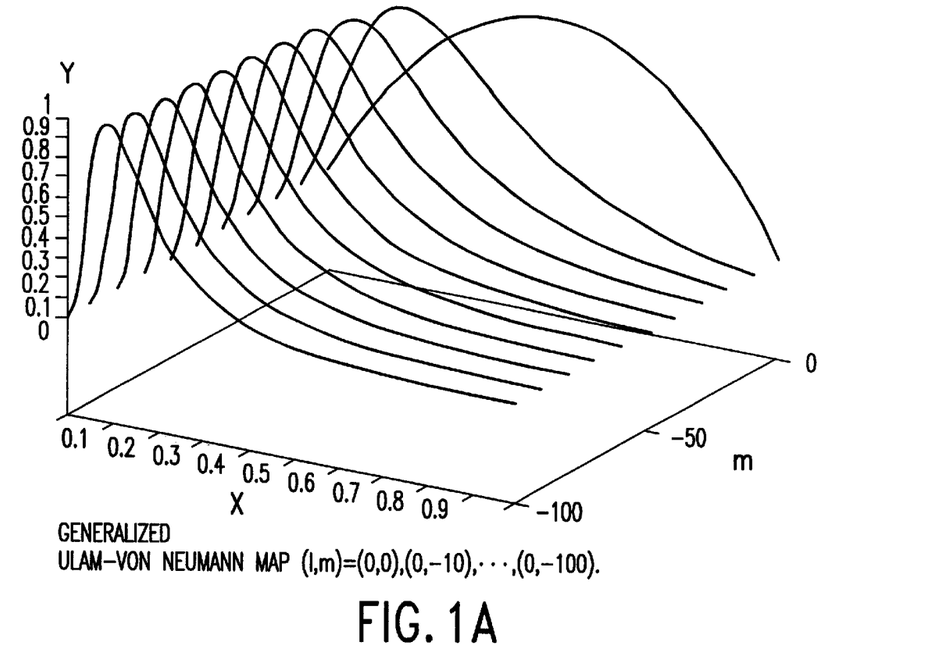
FIGS. 1A–1D show an example of an ideal model of chaotic map F(x).
Figure 1B:
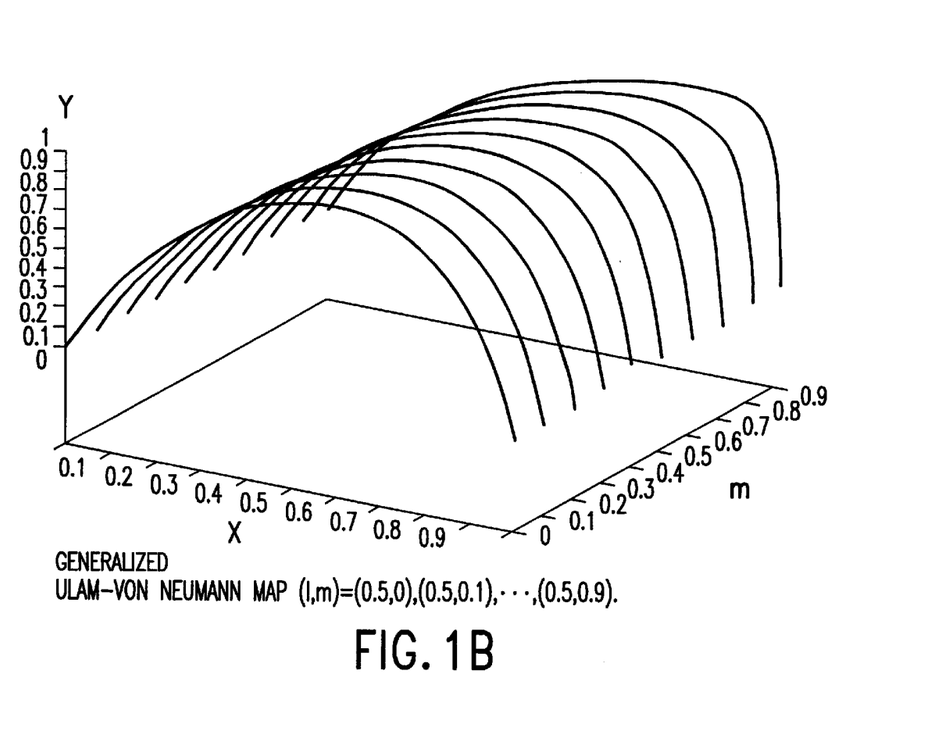
Figure 1C:
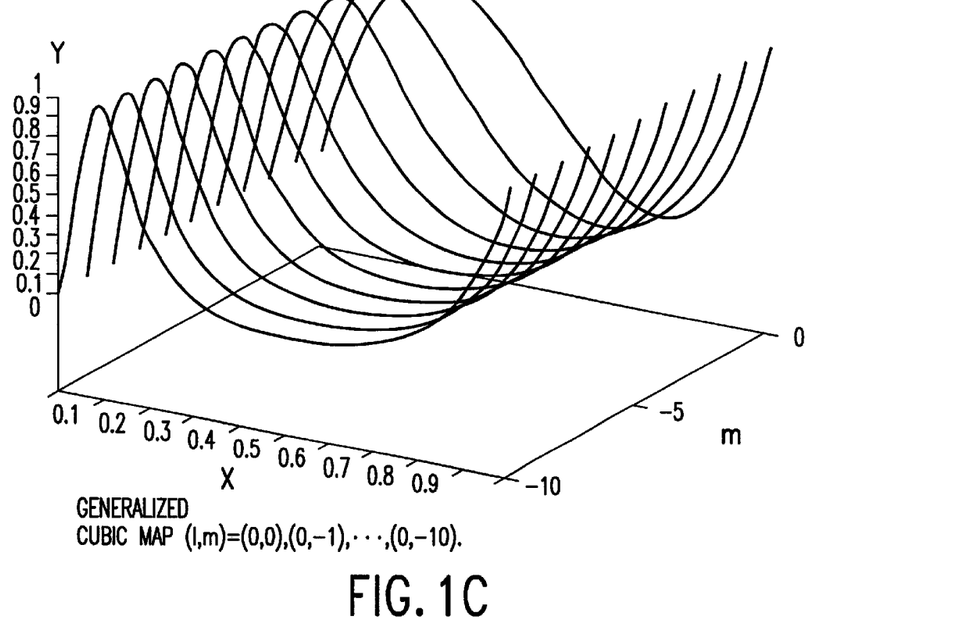
Figure 1D:
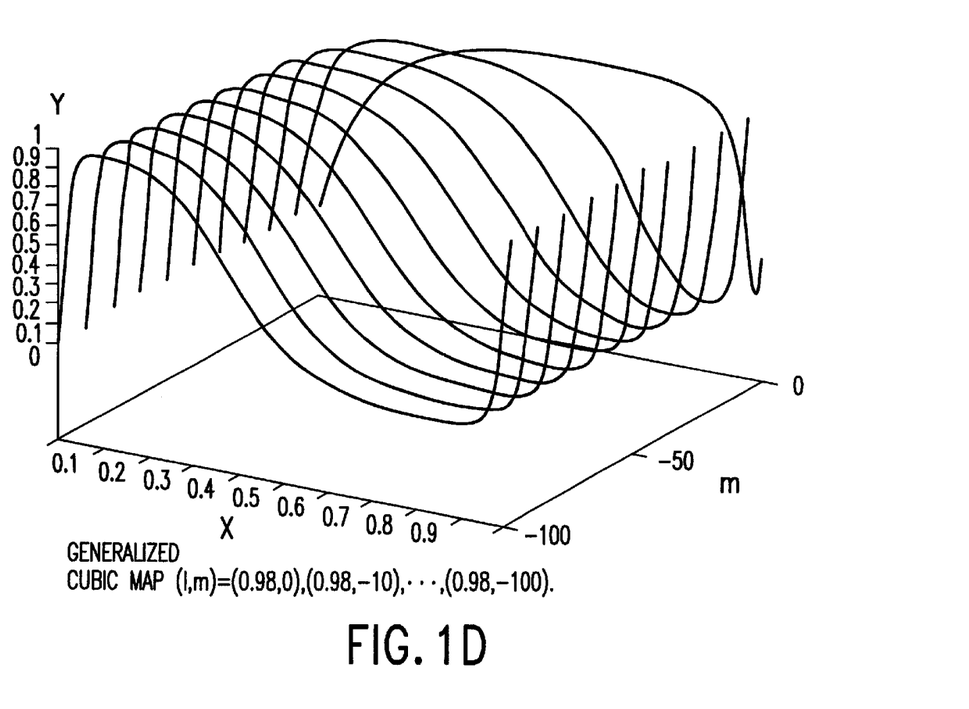

Case 1 of the formula (4) represents a generalized Ulam-von Neumann map, which map is illustrated in FIGS. 1A and 1B. On the other hand, Case 2 depicts the generalized cubic map illustrated in FIGS. 1C and 1D. The present invention is characterized by the fact that all the maps are algebraic maps derived from an addition theorem of an elliptic function.

Formula (4)

Case 1:

$$F(x) = \frac{4x(1-x)(1-lx)(1-mx)}{1 + Ax^2 + Bx^3 + Cx^4}$$

Case 2:

-continued $$F(x) = \frac{x\left(-3 + 4x + \sum_{i=1}^{4} A_i^{(3)} x^i\right)^2}{1 + \sum_{i=2}^{9} B_i^{(3)} x^i}$$

Formula (5)

$$\mu(dx) = \rho(x)dx$$

$$\rho(x) = \frac{1}{2K(l, m)\sqrt{x(1-x)(1-lx)(1-mx)}}$$

It should be mentioned that the terms A, B, C, $A_1(3), \ldots A_4(3), B_2(3), \ldots B_2(9)$, employed in formula (4) advantageously can be expressed as noted in formula (6). Moreover, K(l,m), which appears in the formula (5), is expressed by formula (7). It should be mentioned that K(l,m) is a transcendental real number, which can represented by a complete elliptic integral, where l and m are parameters satisfying the condition $-\infty < m \leq l < 1$.

Formula (6)

$A = -2(l+m+lm)$ $B = 8lm$ $C = l^2 + m^2 - 2lm - 2l^2m - 2lm^2 + l^2m^2 - \infty < m \leq l < 1$ $A_1^{(3)} = 4(l+m)$, $A_2^{(3)} = -6(l+m+lm)$, $A_3^{(3)} = 12lm$, $A_4^{(3)} = l^2 + m^2 - 2lm - 2l^2m - 2lm^2 + l^2m^2$, $B_2^{(3)} = -12(l+m+lm)$, $B_3^{(3)} = 8(l+m+l^2+m^2+l^2m+lm^2+15lm)$, $B_4^{(3)} = 6(5l^2+5m^2-26lm-26l^2m-26lm^2+5l^2m^2)$, $B_5^{(3)} = 24(-2l^2-2m^2-2l^3-2m^3+4lm+7l^2m+7lm^2)+24(4l^3m+4lm^3+7l^2m^2-2l^3m^2-2l^2m^3)$, $B_6^{(3)} = 4(4l^2+4m^2+4l^4+4m^4+17l^3+17m^3-8lm)+4(-17l^2m-17lm^2-17l^3m-17lm^3-8l^4m-8lm^4)+4(4l^2m^4+4l^4m^2-17l^2m^2-17l^2m^3+17l^3m^3-54l^2m^2)$, $B_7^{(3)} = 24(-l^3-m^3-l^4-m^4+l^2m+lm^2-l^3m-lm^3)+24(l^4m+lm^4+4l^2m^2+4l^3m^2+4l^2m^3)+24(l^4m^2+l^2m^4-l^3m^3-l^4m^3-l^3m^4)$, $B_8^{(3)} = 3(3l^4+3m^4+4l^3m+4lm^3+4l^4m+4lm^4-14l^2m^2)+3(-4l^3m^2-4l^2m^3-4l^3m^3-14l^4m^2-14l^2m^4+4l^4m^3+4l^3m^4+3l^4m^4)$, $B_9^{(3)} = 8(-l^4m-lm^4+l^3m^2+l^2m^3+l^4m^2+l^2m^4-2l^3m^3+l^4m^3+l^3m^4-l^4m^4)$ Formula (7)

$$K(l, m) = \int_0^1 \frac{du}{\sqrt{(1-u^2)(1-lu^2)(1-mu^2)}}$$

It is known that whether a certain Monte Carlo method is good or bad, that is, whether or not the Monte Carlo method is reliable, depends on whether the method of generating random numbers is good or bad. See, for example, the text by D. E. Knuth "The Art of Computer Programming", 1981, second edition, Addition-Wesley), which is incorporated herein by reference. This statement can be understood from the fact that a history of the Monte Carlo method, starting from a general formulation of the Monte Carlo algorithm by J. von Neumann and S. M. Ulam in 1947 (N. Metropolis, in "From Cardinals to Chaos", edited by N. G. Cooper, p. 125, Cambridge University Press, 1989), is the history as to how to generate excellent uniform random numbers. Examples of such random number generation techniques include the middle-square method popularized by J. von Neumann (1940's), the linear recurrence generator proposed by D. H. Lehmer (Takao Tsuda, "Monte Carlo method and simulation", Baifukan, third edition, 1995).

From the discussion above, it will be appreciated that the Monte Carlo method and the random number generators are closely associated with each other. As described above, the Monte Carlo method successfully uses ergocidity of a deterministic equation (1) for generating the random numbers. On the other hand, a chaotic dynamical system has a deterministic nature as described in equation (1). Thus, t presence of an invariant measure is also confirmed in equation. The present invention is directed to provide a statistical simulation method, like that employed by the Monte Carlo method, but employing the ergodic property of deterministic chaos. However, it should be mentioned that, when an invariant measure $\mu(dx)$ is not explicitly expressed in the formula (2) representing the ergodicity, the right side of the formula (2) is not clear. This results in meaninglessness in all types of Monte Carlo computations. Although the presence of an invariant measure is confirmed in conventional chaotic dynamical systems, it is generally difficult to explicitly express the invariant measures $\mu(dx)$ except for a particular case.

Examples of known chaotic dynamical systems with explicit invariant measures $\mu(dx)$ (hereinafter referred to as a solvable chaos), are the Ulam-von Neumann map (S. M. Ulam and J. von Neumann, Bull.Am. Math. Soc. 53(1947), 1120), the Chebyshef map (R. L. Adler and T. J. Rivlin, Proc. Am. Math. Soc. 15(1964), 794), and the Katsura-Fukuda map (S. Katsura et al., Physics A 130(1985),597) The inventor of the present invention was devoted to the study of the subject without yielding to this established theory. As a result, the maps mentioned above advantageously can be generalized to a class of chaotic dynamical systems including such a series of ergodic maps. See, for example, K. Umeno, "Method of Constructing Exactly Solvable Chaos" Phys. Rev.E (1997), vol.55, No.5 (May 1) 5280–5284, which paper is incorporated herein by reference. It should be mentioned that these maps can be fully generalized so that they may be of any algebraic function representing the application of an addition theorem to an elliptic function in order that they can be used as the ideal model of chaos F(x). It should also be mentioned that the present invention is superior in executing the statistical simulation method, to thereby statistically compute an expected value of a physical quantity or the like.

That is, in the random number generating method according to the present invention expressed by the formula (4), the dynamical system itself has two real-numbered parameters (l,m). As discussed in the reference K. Umeno, Phys. Rev. E., 55 (1997) 5280–5284, incorporated by reference herein, parameters l and m are real valued numbers of a characterizing generalized Ulam-von Neuman map and generalized Cubic maps satisfying the relation $-\infty < m \leq l < 1$. If m=0, then l corresponds to the squared module of Jacobi's elliptic functions. It will be appreciated that the chaotic map can be represented by infinite types specified by the parameters. The nonuniform density function can also be explicitly determined as an algebraic function of a dynamical variable x and the parameters (l,m). it will be appreciated that this is one significant feature of the present invention.

Furthermore, since this(these) algebraic map(s) has(have) a nonlinear characteristic, e.g., logistic map $F(x)=4x(1-x)$, a random number sequence generated in accordance with this map has periodicity (chaos) in general. Thus, the random number sequence has a very long period.

It will be appreciated that for the conventional Monte Carlo method, since the random numbers are generated one for each step, the computing speed of a computer executing the conventional Monte Carlo method is slow. However, since the conventional Monte Carlo method can generate an optionally long random number sequence, the required computing precision can be obtained. This is reflected in the universal central limit theorem, which theorem is well known to one of ordinary skill in the art. Therefore, even in case of the present invention, the longer the period of the random number sequence obtained by the method of the present invention is, the more the computing precision can be improved.

As described above, the random number sequence generated by the present invention has a periodicity (chaos) and a very long or extremely long period. The present invention thus has features suitable for statistical simulation method.

In order to compare the method of the present invention with the conventional Monte Carlo method based on uniform random numbers, a computation of a multiple integral was executed as a so-called benchmark test. Exclusive of an exceptional case, the result obtained clearly demonstrates that the simulation method according to the present invention employing nonuniform random numbers is superior to the conventional Monte Carlo method using uniform random numbers. Moreover, the mean square error is smaller. In other words, the convergence of the computation is more rapidly performed using the simulation method of the present invention than with the conventional Monte Carlo method. Although the cause of this effect is not yet completely understood, it is considered that the method according to the present invention has noticeable superiority over the conventional method in the fact that the present invention is based on the method of systematically generating infinite types of random numbers characterized by the parameters (l,m).

Moreover, the random number generating method, which is one aspect of the present invention, can be described by a single nonlinear algebraic function alone. Therefore, application of the method in a computer can be easily accomplished either by using existing software, e.g., Fortran language, or by employing dedicated hardware or firmware, as discussed in greater detail below. The net effect of the use of a single nonlinear algebraic function is that the computing time per step can thus be reduced. Furthermore, the method of the present invention can also accommodate a natural parallelism of the computation in the same manner as the conventional Monte Carlo method. More specifically, for the computation of a multiple integral, the present invention exhibits an unrivaled performance in all of the preferred embodiments of the statistical simulation methods, e.g., see the second embodiment as described below.

In a third preferred embodiment according to the present invention, which is described below, the nonuniform random number sequence for use in the method of the present invention can be also converted into the uniform random number sequence on the basis thereof. That is, the method of the present invention can be applied, without change, to the conventional Monte Carlo method. It will be appreciated that some solvable chaos representations generate uniform random number sequences like a piecewise linear map, e.g., a tent map. In general, since such chaos has a relatively short period, this map is generally not suitable for the Monte Carlo method. On the other hand, the uniform random number generating method based on the present invention can extend the period of the nonuniform random number sequence as much as desired because of the nonlinearity of a map F(l,m). The uniform random number sequence of a long period can thus be generated. Therefore, the simulation method according of the present invention is at least as effective as the conventional Monte Carlo method.

As a result, the simulation method according to the present invention can be applied to such diverse fields as computations and simulations, at least to the same extent as the conventional Monte Carlo method is applicable. An example of this wide application is Monte Carlo simulation for determining design tolerance limits associated with a design method, e.g., worst case design, in which the worst case of an electric circuit is assumed. See the article by C. W. Kemp entitled "Monte Carlo Analysis and Design—Application to Crystal Oscillator," IEEE Transaction on Communication Technology, Com-14(1966), 329, which article is also incorporated by reference herein.

The basic concept of this specific simulation is as follows. A circuit parameter is defined in terms of a random variable having a fluctuation near a nominal value, e.g., a resistor R with a known variance is used in generating, i.e., postulating, a number of exemplary circuits. The operation of these exemplary circuits is simulated, whereby a life test advantageously can be performed on each. This methodology can be also applied to device modeling, which is effective for the simulation of such diverse verse elements as a heterojunction device, and TED ("Gunn Effect Device"), MOSFET, MESFET, bipolar transistors, hetero-structure devices, Schottky diodes and photo-detectors. It will be appreciated that design and construction of these devices were previously facilitated with the conventional Monte Carlo method. More specifically, a large portion of all numerical analysis operations are based on the computation of the multiple integral, which exhibits noticeable effectivity when the random numbers having a nonuniform distribution, which is the basis of the present invention, are used. One exemplary application thereof is a computing method for finding the maximum and minimum values of a multidimensional multimodal function. In this case, there is no effective computing method other than the Monte Carlo method.

This optimization problem is equivalent to non-linear programming, which is also considered to be an extension of linear programming in the operation research (OR) field. The optimization problem is also applicable to a scheduling problem.

Embodiment 1

Figure 2:
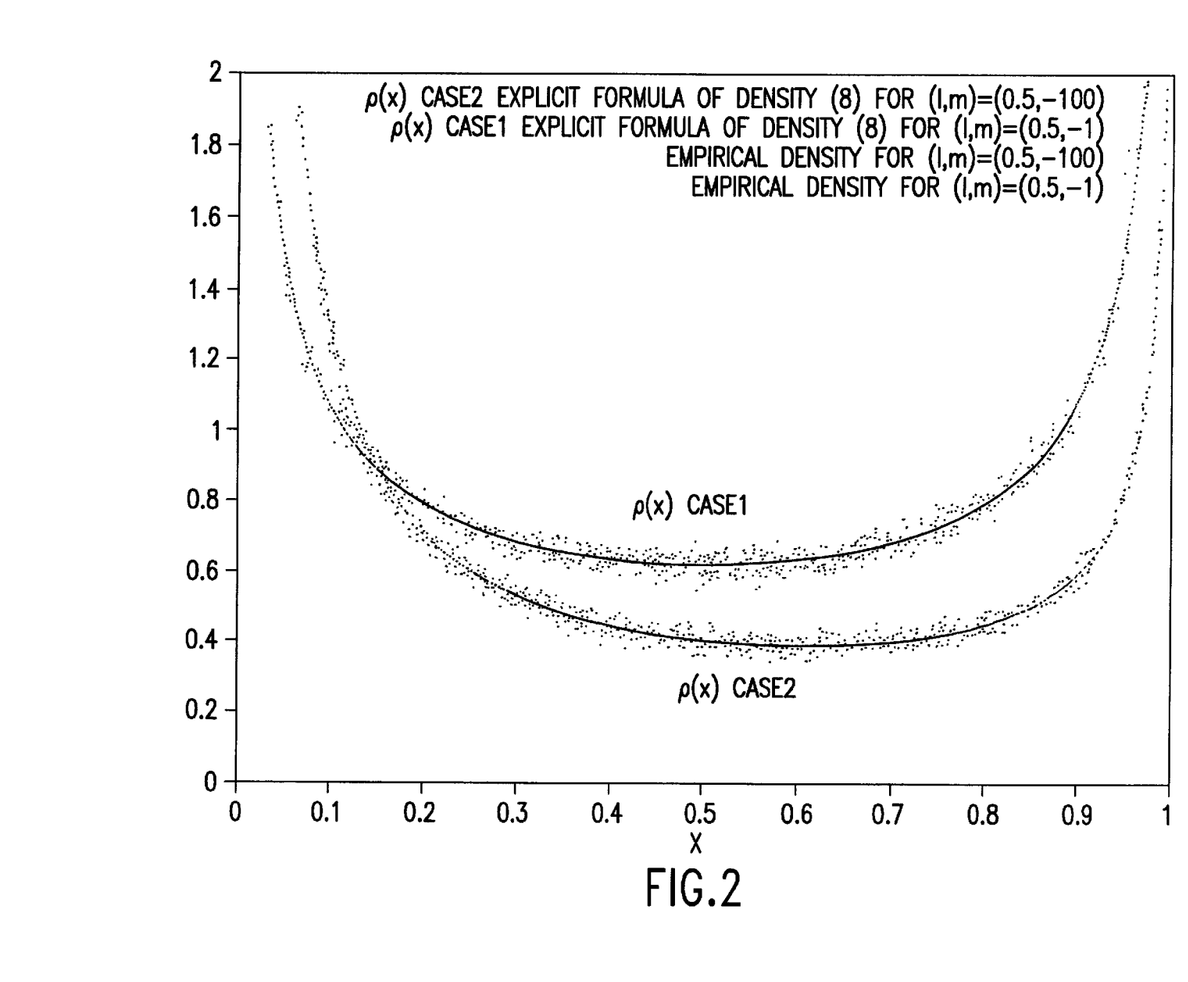
FIG. 2 shows an example of a nonuniform density function ρ(x).

Figs. 1A–1D show examples of solvable chaos, that is, the ideal models of chaos maps F(x). The nonuniform density function ρ(x) of the invariant measure is shown in FIG. 2 while FIG. 3 presents a comparison between the method of the present invention using the solvable chaos and the conventional Monte Carlo method.

Figure 3:
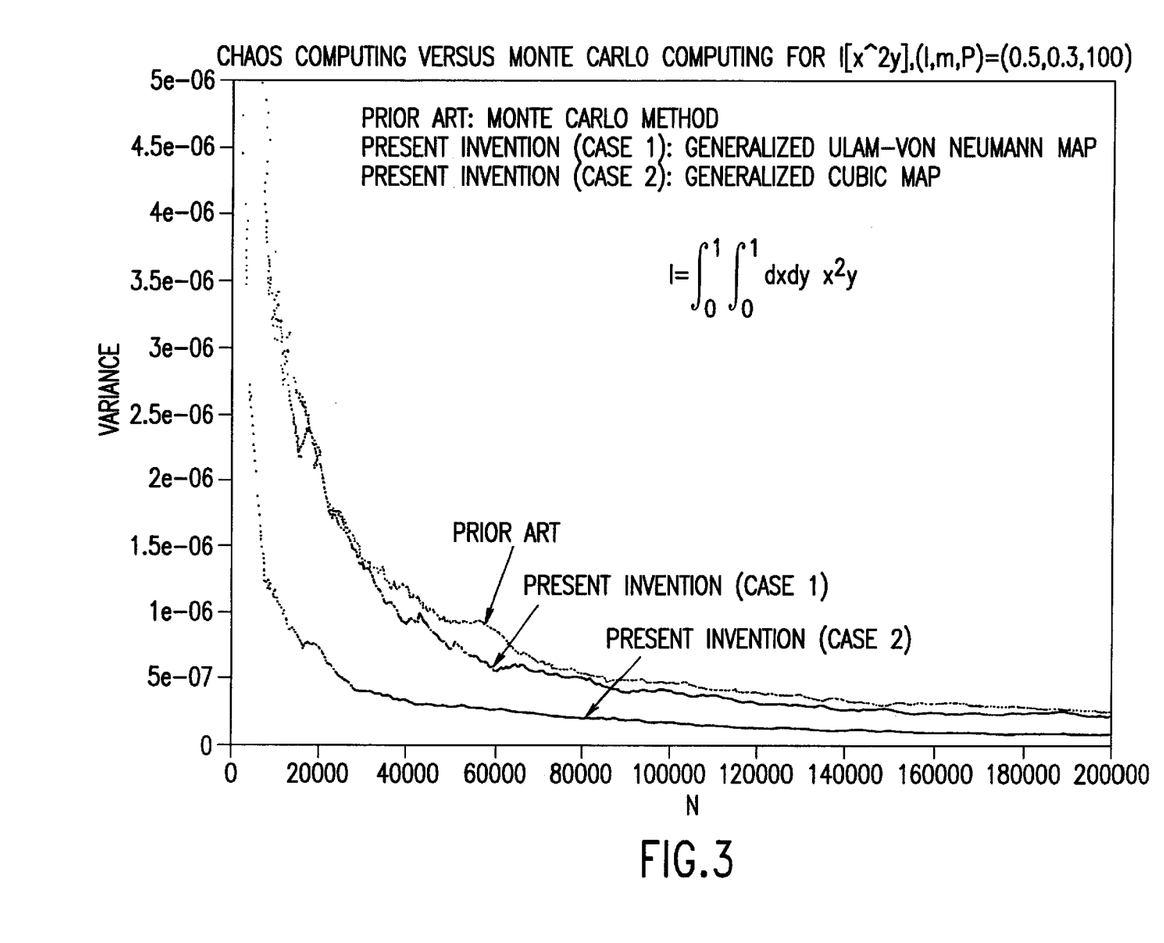
FIG. 3 shows a comparison between a method of the present invention and a Monte Carlo method using uniform random numbers.

As can be seen from FIG. 3, the method according to the present invention is superior to the Monte Carlo method in that the convergence is more quickly achieved. A main reason for this effect is believed to result from an improvement of the computing speed due to the difference between the Monte Carlo method, which requires generation of one of the random numbers for each step in the simulation, and the method according to the present invention, which can advantageously generate the non-uniform random number sequence of a long period in a dedicated random number generating method. Moreover, the simulation method according to the present invention results in a reduction of computing error due to the use of a solvable chaos.

Embodiment 2

An exemplary method employing the present invention is a method of computing an optional multiple integral f(X1, X2,X3, ... ,Xn). It should be mentioned that the integral is within a range of $0 \leq Xi \leq 1$ with respect to each i.

Step 1: Give appropriate initial values X1, X2, X3, ... , Xn;

Step 2: Update each Xi in accordance with the chaos dynamical system Xi:=F(l,m) (Xi);

Step 3: Repeat Step 2 N times;

Step 4: Compute a time average of f(X1,X2, ... Xn)G (X1)G(X2) ... G(Xn) and each G(Xi):<f(X1, X2, ... ,Xn) G(X1)G(X2) ... G(Xn)>G(Xi)>, where G(X)·G(X)=X(1−X)(1−1X)(1−mX) for m≦1<1; and Step 5: Find an approximate solution of the multiple integral determined by I(f)=<f(X1,X2, ... Xn)G(X1) G(X2) ... G(Xn)>/<G(Xn)> due to the ergodicity of the chaotic dynamical system Y=F(l,m)(X).

With regard to the specific form of a rational formula F(l,m)(X), see equation (5), which denotes a generalized Ulam-von Neumann map, or equation (25), which presents generalized cubic map, the latter equation being located in the article entitled "Method of Constructing Exactly Solvable Chaos," Phys. Rev. E (1997),5280, which article, as previously mentioned, is incorporated herein by reference. Equation (25) is reproduced for ready reference immediately below.

$$Y = f_{l,m}^{(3)}(X) = \frac{X\left(-3 + 4X + \sum_{i=1}^{4} A_i X^i\right)^2}{1 + \sum_{i=2}^{9} B_i X^i}, \qquad (25)$$

Embodiment 3

The third preferred embodiment according to the present invention permits system simulation using the conventional Monte Carlo methodology while the chaos mapping discussed above. Thus, the third embodiment comprises an algorithm for converting from a nonuniform distribution to a uniform distribution. The steps performed by the algorithm are as follows.

Step 1: Update each Xi in accordance with the chaotic dynamical system Xi=F(l,m)(Xi);

Step 2: Obtain Yi:=Sqrt(Xi), i.e., Yi X Xi=Xi; and

Step 3: $Zi=s^{-1}(Sqrt(Yi))/K$, which values represent the random numbers having the uniform distribution.

It should be noted that $s^{-1}(X)$ and K are defined by equations (9) and (7), both of which are found in the above referenced Umeno article. For Convenience, equations (7) and (9) are reproduced immediately below. It should also be noted that when the uniform random numbers are actually generated according to the third embodiment of the present invention, it is highly efficient to store numerical values of $s^{-1}(X)$ and K in the form of a reference table, i.e., in the form of a lookup table, in the computer hardware, as discussed in greater detail below.

$$K(l, m) = \int_0^1 \frac{du}{\sqrt{(1-u^2)(1-lu^2)(1-mu^2)}}, \qquad (7)$$

$$s^{-1}(x) = \int_0^x \frac{du}{\sqrt{(1-u^2)(1-lu^2)(1-mu^2)}}. \qquad (9)$$

According to the present invention, the random number sequence having the long period is generated by the use of the ideal model of chaos map F(x). Thus, as discussed above, the rate of execution of a computer executing the statistical simulation method according to the present invention is considerably faster than the execution speed when the conventional Monte Carlo method is performed. Stated another way, the simulation method according to the present invention advantageously permits generation of the random numbers using solvable chaos represented by an explicit nonuniform density function ρ(x). Moreover, when the inventive random number generating method is employed, the computing error is considerably lower than the error achieved by the conventional Monte Carlo method. Accordingly, the convergence of the computation can be rapidly performed due to the improvement of computing speed and the reduction of computing error.

Moreover, since the other preferred embodiments according to the present invention are performed in the same manner as the conventional Monte Carlo method, the statistical simulation according to the present invention can be performed in the same manner as the Monte Carlo method. Therefore, the time for the convergence of the computation can be reduced, whereby problems, which have not been heretofore able to be treated, can be solved.

Figure 4:
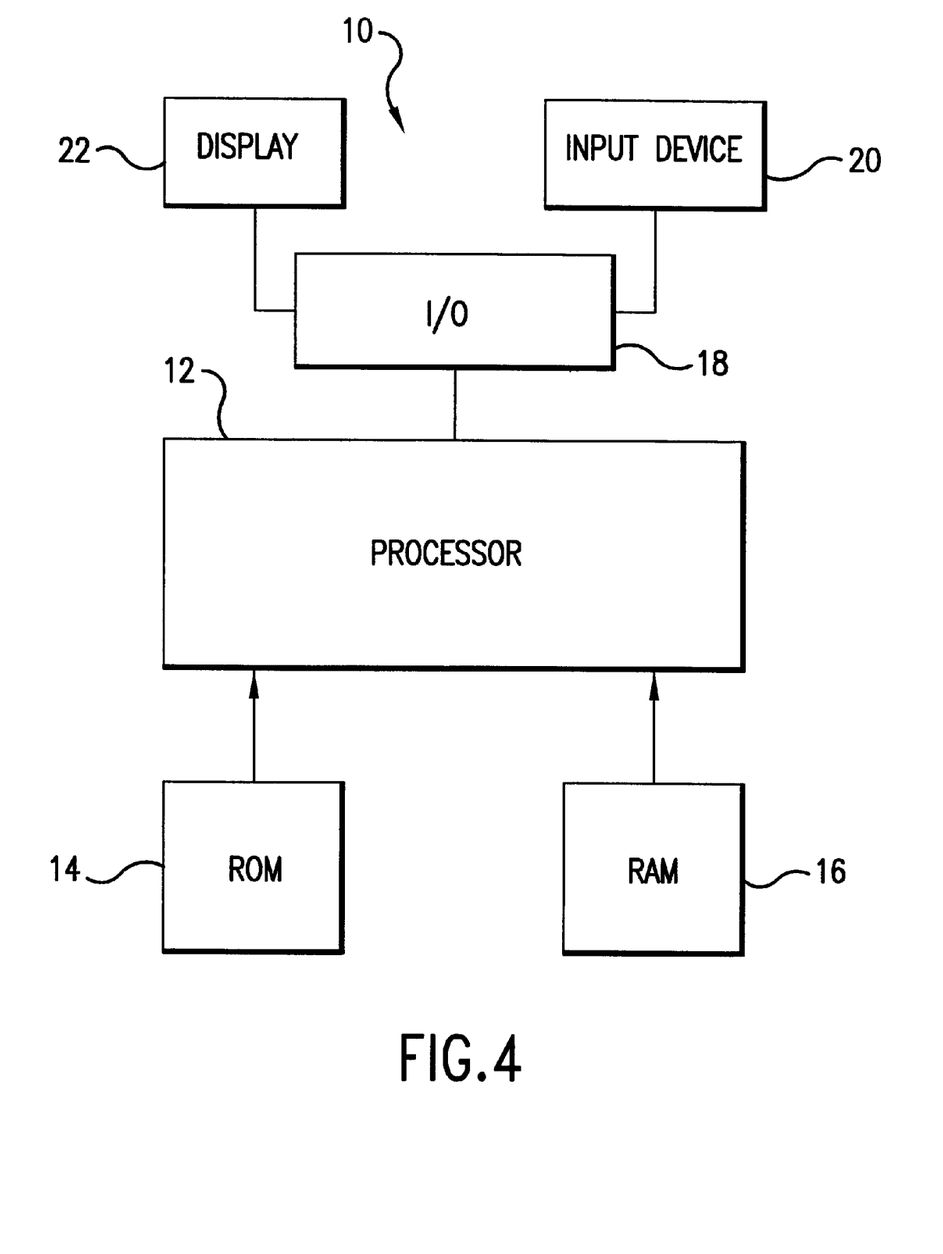
FIG. 4 is a high level block diagram of a computer simulation system according to yet another preferred embodiment of the present invention.

It will be appreciated that the present invention is not limited to the above-described embodiments. For example, a computer comprising a dedicated statistical simulation system and a storage medium which stores computer readable code for converting a general purpose computer into a dedicated simulation device are both considered to be within the scope of the present invention. It will be appreciated that the above-mentioned computer advantageously can be any computing device including a processor, memory, and at least one input/output (I/O) device. See FIG. 4, wherein a computer 10 including a processor 12, a read only memory (ROM) 14, a random access memory (RAM) 16, an I/O device 18, which connects the processor 12 to an input device 20 and a display 22, is illustrated. Thus, the computer system contemplated by the inventor ranges from the fastest supercomputer to a computer on a chip, and all computer devices in-between. Preferably, the storage medium is one of a CD-ROM, a hard drive, a floppy disk, an electro optical storage device, or a volatile or non-volatile solid state memory.

It is to be understood that although the present invention has been set forth in the several preferred embodiments, the scope of the present invention is not limited to these embodi-

What is claimed is:

1. In a statistical simulation method for statistically performing a computation by generating random numbers and constructing a stochastic phenomenon for one of the computation of an expected value of a physical quantity and a many-body problem, the improvement comprising the step of generating chaotic random numbers having a non-uniform density function ρ(x) using a chaotic dynamical system of the form $$Xn+1 = F(Xn)$$

wherein F(X), which represents the chaotic dynamical system, is expressed by an algebraic function derived from an addition theorem of an elliptic function having a generalized Ulan-von Neumann map in the form:

$$F(x) = \frac{4x(1-x)(1-lx)(1-mx)}{1 + Ax^2 + Bx^3 + Cx^4}$$

where:

$A = -2(l+m+lm)$ $B = 8lm$ $C = l^2 + m^2 - 2lm - 2l^2m - 2lm^2 + l^2m^2 - \infty < m \leq l < 1$ and constructing said stochastic phenomenon for one of the computation of an expected value of a physical quantity.

2. In a statistical simulation method for statistically performing a computation by generating random numbers and constructing a stochastic phenomenon for one of the computation of an expected value of a physical quantity and a many-body problem, the improvement comprising the step of generating chaotic random numbers having a non-uniform density function ρ(x) using a chaotic dynamical system of the form $$i\ Xn+1 = F(Xn)$$

wherein F(X), which represents the chaotic dynamical system, is expressed by an algebraic function derived from an addition theorem of an elliptic function having a generalized cubic map expressed in the form:

$$F(x) = \frac{\left(x\left(-3 + 4x + \sum_{i=1}^{4} A_i^{(3)} x^i\right)\right)^2}{1 + \sum_{i=2}^{9} B_i^{(3)} x^i}$$

where:

$A_1^{(3)} = 4(l+m)$ $A_2^{(3)} = -6(l+m+lm)$, $A_3^{(3)} = 12lm$, $A_4^{(3)} = l^2 + m^2 - 2lm - 2l^2m - 2lm^2 + l^2m^2$, $B_2^{(3)} = -12(l+m+lm)$, $B_3^{(3)} = 8(l+m+l^2+m^2+l^2m+lm^2+15lm)$, $B_4^{(3)} = 6(5l^2 + 5m^2 - 26lm - 26l^2m - 26lm^2 + 5l^2m^2)$, $B_5^{(3)} = 24(-2l^2 - 2m^2 - 2l^3 - 2m^3 + 4lm + 7l^2m + 7lm^2) + 24(4l^3m + 4lm^3 + 7l^2m^2 - 2l^3m^2 - 2l^2m^3)$, $B_6^{(3)} = 4(4l^2 + 4m^2 + 4l^4 + 4m^4 + 17l^3 + 17m^3 - 8lm) + 4(-17l^2m - 17lm^2 - 17l^3m - 17lm^3 - 8l^4m - 8lm^4) + 4(4l^3m^4 + 4l^4m^2 - 17l^3m^2 - 17l^2m^3 + 17l^3m^3 - 54l^2m^2)$, $B_7^{(3)} = 24(-l^3 - m^3 - l^4 - m^4 + l^2m + lm^2 - l^3m - lm^3) + 24(l^4m + lm^4 + 4l^2m^2 + 4l^3m^2 + 4l^2m^3) + 24(l^4m^2 + l^2m^4 - l^3m^3 - l^4m^3 - l^3m^4)$, $B_8^{(3)} = 3(3l^4 + 3m^4 + 4l^3m + 4lm^3 + 4l^4m + 4lm^4 - 14l^2m^2) + 3(-4l^3m^2 - 4l^2m^3 - 4l^3m^3 - 14l^4m^2 - 14l^2m^4 + 4l^4m^3 + 4l^3m^4 + 3l^4m^4)$, $B_9^{(3)} = 8(-l^4m - lm^4 + l^3m^2 + l^2m^3 + l^4m^2 + l^2m^4 - 2l^3m^3 + l^4m^3 + l^3m^4 - l^4m^4)$ and constructing said stochastic phenomenon for one of the computation of an expected value of a physical quantity.

* * * * *

UNITED STATES PATENT AND TRADEMARK OFFICE
CERTIFICATE OF CORRECTION

PATENT NO.    : 6,289,296 B1
DATED         : September 11, 2001
INVENTOR(S)   : Ken Umeno

It is certified that error appears in the above-identified patent and that said Letters Patent is hereby corrected as shown below:

<u>Title page,</u>
Item [73], Assignee should read as follows:
-- [73] Assignee:  (1) The Institute of Physical and Chemical Research (RIKEN), Wako (JP), 50% undivided joint interest; and
(2) Ken Umeno, Tokyo (JP), 50% undivided joint interest --.

Signed and Sealed this

Twenty-fifth Day of June, 2002

*Attest:*

*Attesting Officer*

JAMES E. ROGAN
*Director of the United States Patent and Trademark Office*